United States Patent
Sako et al.

(10) Patent No.: US 7,376,833 B2
(45) Date of Patent: May 20, 2008

(54) ANONYMOUS DECRYPTION SYSTEM, ANONYMOUS DECRYPTION METHOD, AND PROGRAM

(75) Inventors: Kazue Sako, Tokyo (JP); Kengo Mori, Tokyo (JP)

(73) Assignee: NEC Corporation, Tokyo (JP)

( * ) Notice: Subject to any disclaimer, the term of this patent is extended or adjusted under 35 U.S.C. 154(b) by 915 days.

(21) Appl. No.: 10/467,860

(22) PCT Filed: Feb. 12, 2002

(86) PCT No.: PCT/JP02/01145

§ 371 (c)(1),
(2), (4) Date: Feb. 2, 2004

(87) PCT Pub. No.: WO02/065695

PCT Pub. Date: Aug. 22, 2002

(65) Prior Publication Data

US 2004/0114763 A1   Jun. 17, 2004

(30) Foreign Application Priority Data

Feb. 13, 2001   (JP)   ............. 2001-035030

(51) Int. Cl.
*H04L 9/00*   (2006.01)
(52) U.S. Cl. ..................................... 713/168
(58) Field of Classification Search ............. 713/150, 713/168, 171
See application file for complete search history.

(56) References Cited

U.S. PATENT DOCUMENTS 6,049,613 A   4/2000 Jakobsson (Continued)

FOREIGN PATENT DOCUMENTS

EP   1 054 527 A2   11/2000

(Continued)

OTHER PUBLICATIONS

Nakanishi et al., "Mix-net Based Electronic Payment System with Strong Anonymity", *SCIS 2001*, The 2001 Symposium on Cryptography and Information Security, Oiso, Japan, Jan. 23-26, 2001, vol. II or II, pp. 777-781.

(Continued)

*Primary Examiner*—Ellen Tran
(74) *Attorney, Agent, or Firm*—Sughrue Mion, PLLC

(57) ABSTRACT

A anonymous decryption system, the management of which is facilitated and initialization of which is readily and reliably carried out. A shuffling management center (10) transmits a security parameter and common public information generated on the basis of the security parameter to decryption shuffle centers (20-1 to 20-m). The decryption shuffle centers (20-1 to 20-m) generate public keys and decryption keys and returns the public keys to the shuffling management center (10). The shuffling management center combines the returned public key to generate an encryption public key and make the encryption key public. The shuffling management center (10) repeats transfer of encrypted data list to the decryption shuffle center (20-j) having the j-th processing priority when it decrypts the encrypted data list, transfer of a received data list of which a order-switching process and a partial decryption process are carried out to the next decryption shuffle center (20-(j+1)). Such processing is carried out for up to the last decryption shuffle center (20-m) and make the data list from there the decryption result.

71 Claims, 10 Drawing Sheets

U.S. PATENT DOCUMENTS 6,570,989 B1 * 5/2003 Ohmori et al. ............... 380/42
6,950,948 B2 * 9/2005 Neff ........................... 705/12

FOREIGN PATENT DOCUMENTS

| EP | 1 302 020 B1 | 11/2005 |
|----|--------------|---------|
| JP | H08-263575 A | 10/1996 |
| JP | H09-288658 A | 11/1997 |

OTHER PUBLICATIONS

Kazue Sako, "Denshi Tohyo to Denshi Nyusatsu", *Operations Research*, vol. 45, No. 10, Oct. 1, 2000, pp. 514-519.
Kazue Sako, "Koheisei Hosho Mechanism-Denshi Chusen, Denshi Tohyo", *NEC Giho*, vol. 51, No. 9, Sep. 25, 1998, pp. 172-175.
Yi Mu et al: "Anonymous secure e-voting over a network" Computer Security Applications Conference, 1998. Proceedings. 14th Annual Phoenix, AZ USA Dec. 7-11, 1998, Los Alamitos, CA, USA, IEEE Comput. Soc, US, Dec. 7, 1998, pp. 293-299.

* cited by examiner

ANONYMOUS DECRYPTION SYSTEM, ANONYMOUS DECRYPTION METHOD, AND PROGRAM

TECHNICAL FIELD

The present invention relates to an anonymous decryption technology, and more particularly to an anonymous decryption technology for supplying decryption results while keeping the correspondence to the encrypted data confidential.

BACKGROUND ART

The system described in Japanese Patent Laid-Open Publication No. H08-263575 (JP-A-8-263575) is one known example of a prior-art anonymous decryption system of this type. The anonymous decryption system that is described in this document is based on Mix-Net method, and as shown in FIG. 10, is made up from: a plurality of decryption shuffle centers 100-1 to 100-n, and electronic bulletin board system 200 which is arranged on a network such as the Internet and which can be accessed from the outside.

Each of decryption shuffle centers 100-1 to 100-n is provided with partial decryption means 101, shuffling means 102, and certification means 103. In addition, each of decryption shuffle centers 100-1 to 100-n holds a public key for encryption which is generated in accordance with separately determined security parameters and a decryption key for decryption. The anonymous decryption system that is shown in FIG. 10 employs a key which is combined from the public key of each of decryption shuffle centers 100-1 to 100-n as an public encryption key for encrypting data.

When a plurality of senders (not shown in the figure) write encrypted data which have been encrypted using the public encryption key to electronic bulletin board system 200, decryption shuffle center 100-1, which is first in processing priority, enters the above-described encrypted data that have been written by the plurality of senders as encrypted data list 201 and carries out the following processing.

Decryption shuffle center 100-1 first uses partial decryption means 101 to subject encrypted data list 201 to a partial decryption process. At this time, partial decryption means 101 uses the decryption key that is held by decryption shuffle center 100-1. Decryption shuffle center 100-1 next uses shuffling means 102 to subject the encrypted data list that has undergone partial decryption to an order-switching process.

Decryption shuffle center 100-1 then uses certification means 103 to generate certification data for certifying that the partial decryption process and the order-switching process have been performed correctly. Finally, decryption shuffle center 100-1 writes data 202-1 which includes the encrypted data list (i.e., data list) which has undergone the partial decryption process and the order-switching process and certification data to electronic bulletin board system 200.

When data 202-1 have been written to electronic bulletin board system 200, decryption shuffle center 100-2, which is second in processing priority, performs the same processes on the data list in data 202-1 as the processes carried out by decryption shuffle center 100-1 and writes data 200-2 which includes the data list and certification data to electronic bulletin board system 200.

The same operation is performed successively until the last decryption shuffle center 100-n, and data 203 that includes the decryption result list and certification data are written to electronic bulletin board system 200.

The above-described anonymous decryption system of the prior art uses an electronic bulletin board system and therefore entails several problems as follows. In order to allow each decryption shuffle center to perform the partial decryption process and order-switching process as well as to allow each sender to verify the certification data, each decryption shuffle center and each sender must be able to freely access and read the electronic bulletin board system. Further, in order to prevent illegitimate actions, the writing of data to the electronic bulletin board system must be restricted to authorized data from the authorized senders and the decryption shuffle center. An anonymous decryption system of the prior art must therefore enable each decryption shuffle center and each sender to freely read an electronic bulletin board, and moreover, must restrict the writing of data to an electronic bulletin board to only authorized data from authorized senders and decryption shuffle centers, and these requirements complicate the management.

In addition, from the standpoint of protecting anonymity, in actual operations, each of the decryption shuffle centers which make up an anonymous decryption system are each preferably operated by separate organizations. Operating the system by separate organizations, however, raises the danger of complicating the task of making initial settings which determine the various important parameters (such as keys used by users for encrypting messages) which are necessary for the system. Consequently, there is the danger that the details of determining the important parameters will not be clear, and as a result, there is a potential for problems in the normal operation of the system.

It is therefore an object of the present invention to both eliminate the need for complicated management procedures and to make the initial settings task easier and more reliable.

DISCLOSURE OF THE INVENTION

The anonymous decryption system of the present invention is constituted by one or a plurality of decryption shuffle centers and one shuffling management center. If there is only one decryption shuffle center, the shuffling management center transfers an encrypted data list that is received as input from the outside to the decryption shuffle center, and then supplies the data list (an encrypted data list that has undergone a partial decryption process and an order-switching process at the above-described decryption shuffle center) that is returned from the decryption shuffle center as a decryption result list.

If there are a plurality of decryption shuffle centers, the shuffling management center transfers an encrypted data list that is received as input from the outside to the decryption shuffle center that is first in processing priority, and when the data list is returned from the above-described decryption shuffle center, transfers this list as an encrypted data list to the decryption shuffle center that is second in processing priority. The shuffling management center subsequently repeats the process of transferring the data list that is returned from a particular decryption shuffle center to the decryption shuffle center that is next in processing priority as an encrypted data list, and when the data list is returned from the decryption shuffle center that is last in processing priority, supplies this list as the decryption result list. The anonymous decryption system of the present invention is thus able to decrypt an encrypted data list by simply exchanging data between a shuffling management center and decryption shuffle centers, and thus can eliminate the need for a complex management process such as in the anonymous decryption system of the prior art that uses an electronic bulletin board system.

In addition, because the shuffling management center and each of the decryption shuffle centers together generate public information that includes public encryption keys when a security parameter is entered as input, the anonymous decryption system of the present invention can make the initial settings task easier and more reliable.

BEST MODE FOR CARRYING OUT THE INVENTION

Explanation next regards the details of each of the embodiments of the present invention with reference to the accompanying figures.

Figure 1:
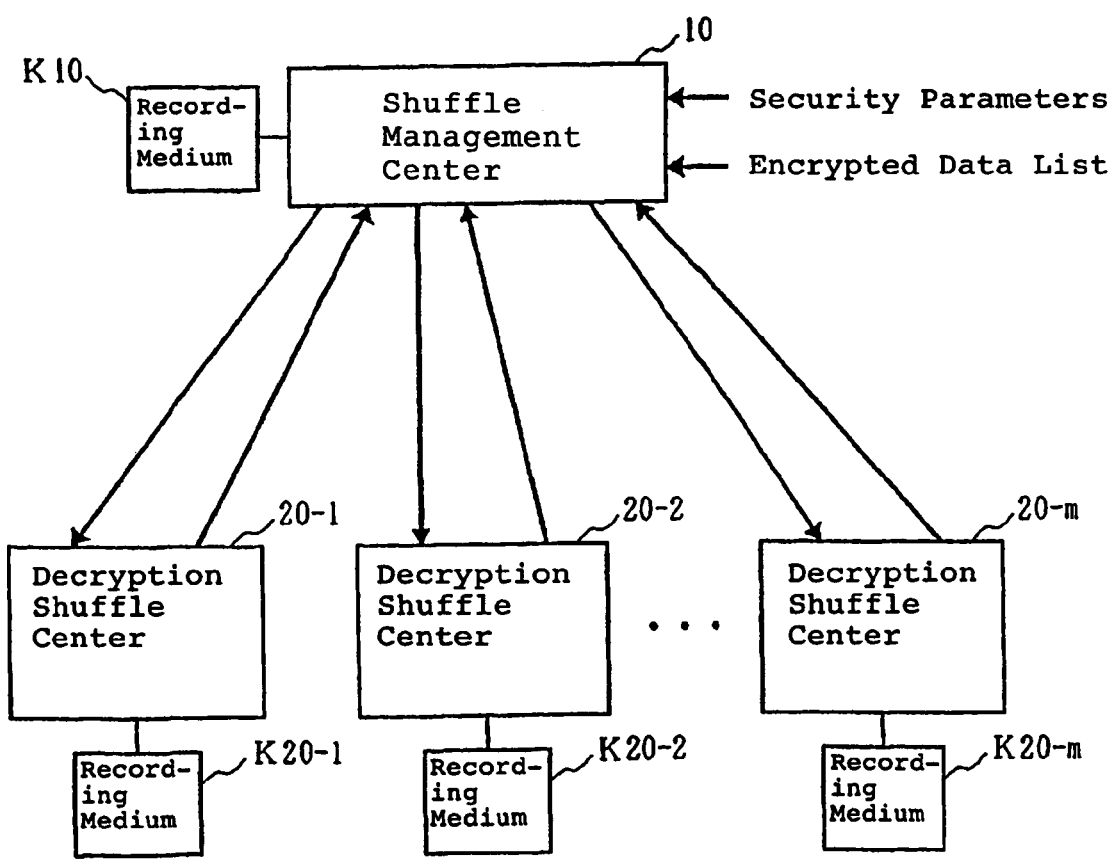
FIG. 1 is a block diagram showing an example of the construction of the first embodiment of the present invention.

Referring first to FIG. 1, in which is shown an anonymous decryption system as the first embodiment of the present invention. This anonymous decryption system is made up from: one shuffling management center 10, and a plurality (m) of decryption shuffle centers 20-1 to 20-m.

Shuffling management center 10 is constituted by a computer and has the functions of, for example, operating in concert with each of decryption shuffle centers 20-1 to 20-m to perform an initial setting process and generate public information that includes, for example, public encryption keys when security parameters are received as input from the outside; and, when an encrypted data list is received as input from the outside that includes a plurality of items of encryption data that have been encrypted by means of public encryption keys, using decryption shuffle centers 20-1 to 20-m in a prescribed order (for example, an order that is instructed from the outside) to decrypt the above-described encrypted data list.

Figure 2:
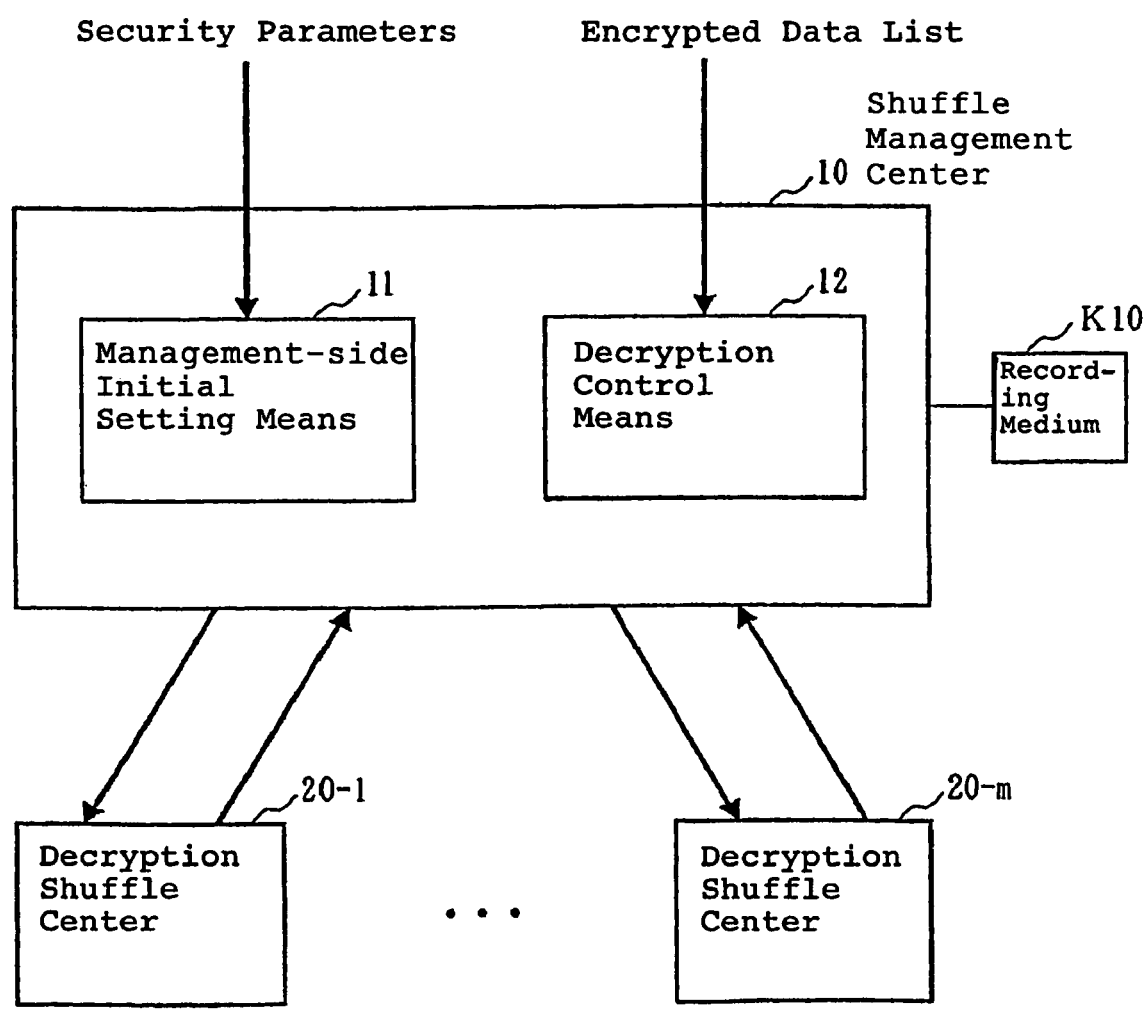
FIG. 2 is a block diagram showing an example of the construction of shuffling management center 10.

As shown in FIG. 2, shuffling management center 10 having these functions is provided with management-side initial setting means 11 and decryption control means 12.

Management-side initial setting means 11 has functions such as generating and publishing public information that includes, for example, public encryption keys in concert with each of decryption shuffle center 20-1 to 20-m when security parameters are received as input from the outside. Decryption control means 12 has the function of, when an encrypted data list is received as input from the outside, successively using each of decryption shuffle centers 20-1 to 20-m to decrypt the encrypted data list and publishing a decryption result list, which is the result of decryption.

Recording medium K10, which is connected to shuffling management center 10, is a disk, a semiconductor memory, or another type of recording medium, and records a program for causing shuffling management center 10, which is constituted by a computer, to operate as a part of the anonymous decryption system. This program is read by shuffling management center 10, which is constituted by a computer, and by controlling the operations of shuffling management center 10, realizes management-side initial setting means 11 and decryption control means 12.

Decryption shuffle centers 20-1 to 20-m are constituted by computers and are connected to shuffling management center 10 by, for example, a dedicated circuit. Each of decryption shuffle centers 20-1 to 20-m has the functions of, for example, operating in concert with shuffling management center 10 to carry out an initial setting process and subsequently carrying out an order-switching process and a partial decryption process on the encrypted data list which is transmitted from shuffling management center 10, and returning the result of the processing to shuffling management center 10.

Figure 3:
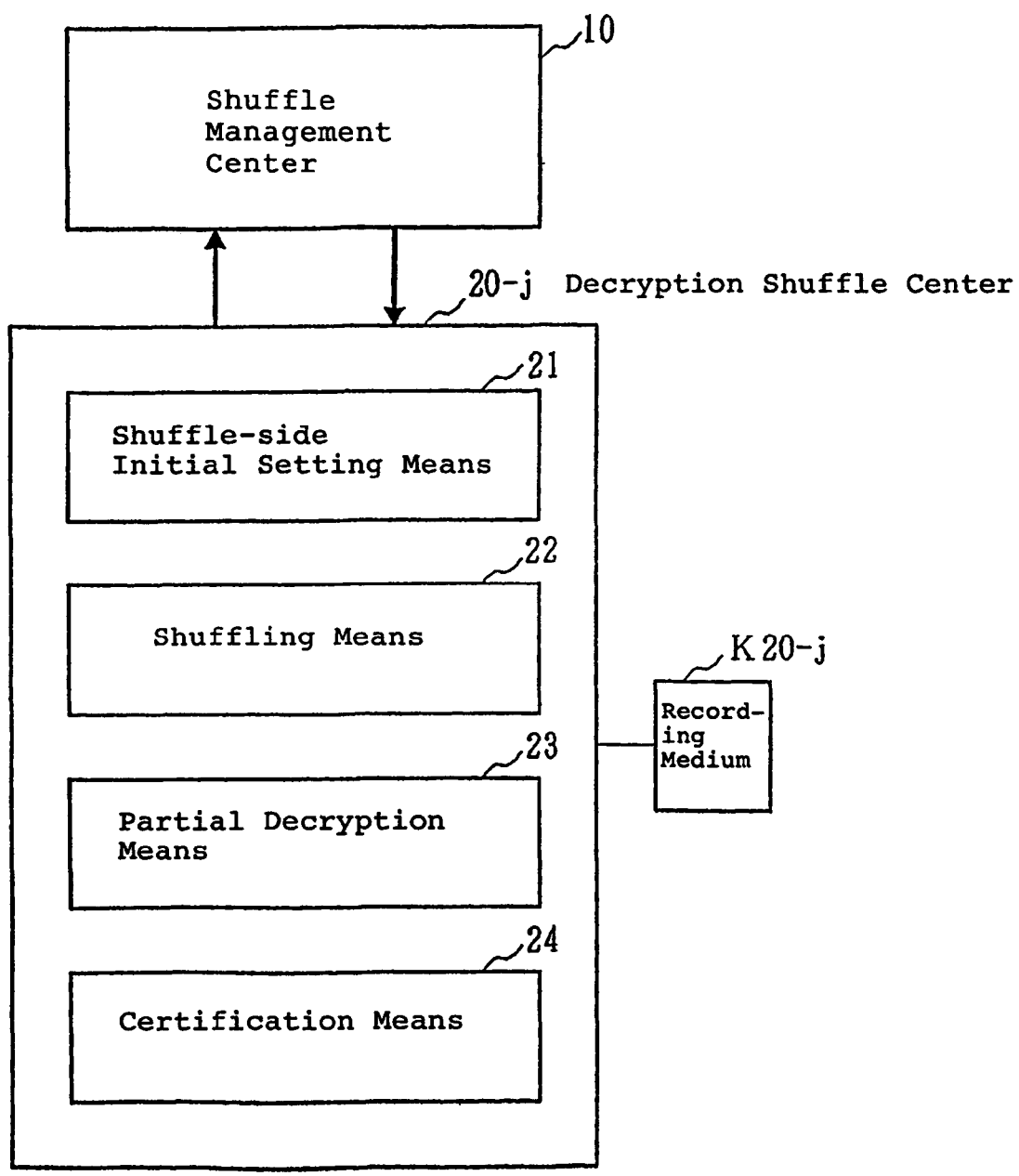
FIG. 3 is a block diagram showing an example of the construction of decryption shuffle center 20-j.

Each of decryption shuffle centers 20-1 to 20-m having these functions is provided with, for example, shuffle-side initial setting means 21, shuffling means 22, partial decryption means 23, and certification means 24, as shown in FIG. 3.

Shuffle-side initial setting means 21 has the functions of carrying out an initial setting process in concert with management-side initial setting means 11. In this initial setting process, shuffle-side initial setting means 21 generates public keys and decryption keys. Shuffling means 22 has the function of subjecting encrypted data lists that are transmitted in from shuffling management center 10 to an order-switching process. Partial decryption means 23 has the function of subjecting on encrypted data lists to a partial decryption process after shuffling means 22 has carried out the order-switching process. Certification means 24 has the functions of generating certification data for certifying that the processing of shuffling means 22 is correct and generating certification data for certifying that the processing of partial decryption means 23 is correct.

Recording medium K20-j that is connected to decryption shuffle center 20-j is a disk, semiconductor memory, or other type of recording medium and records a program for causing decryption shuffle center 20-j, which is constituted by a computer, to function as a part of the anonymous decryption system. This program is read by decryption shuffle center 20-j, which is constituted by a computer, and by controlling the operation of decryption shuffle center 20-j, realizes shuffle-side initial setting means 21, shuffling means 22, partial decryption means 23, and certification means 24 in decryption shuffle center 20-j.

Explanation next regards the details of the operation of this embodiment.

Initial Setting Process

Figure 4:
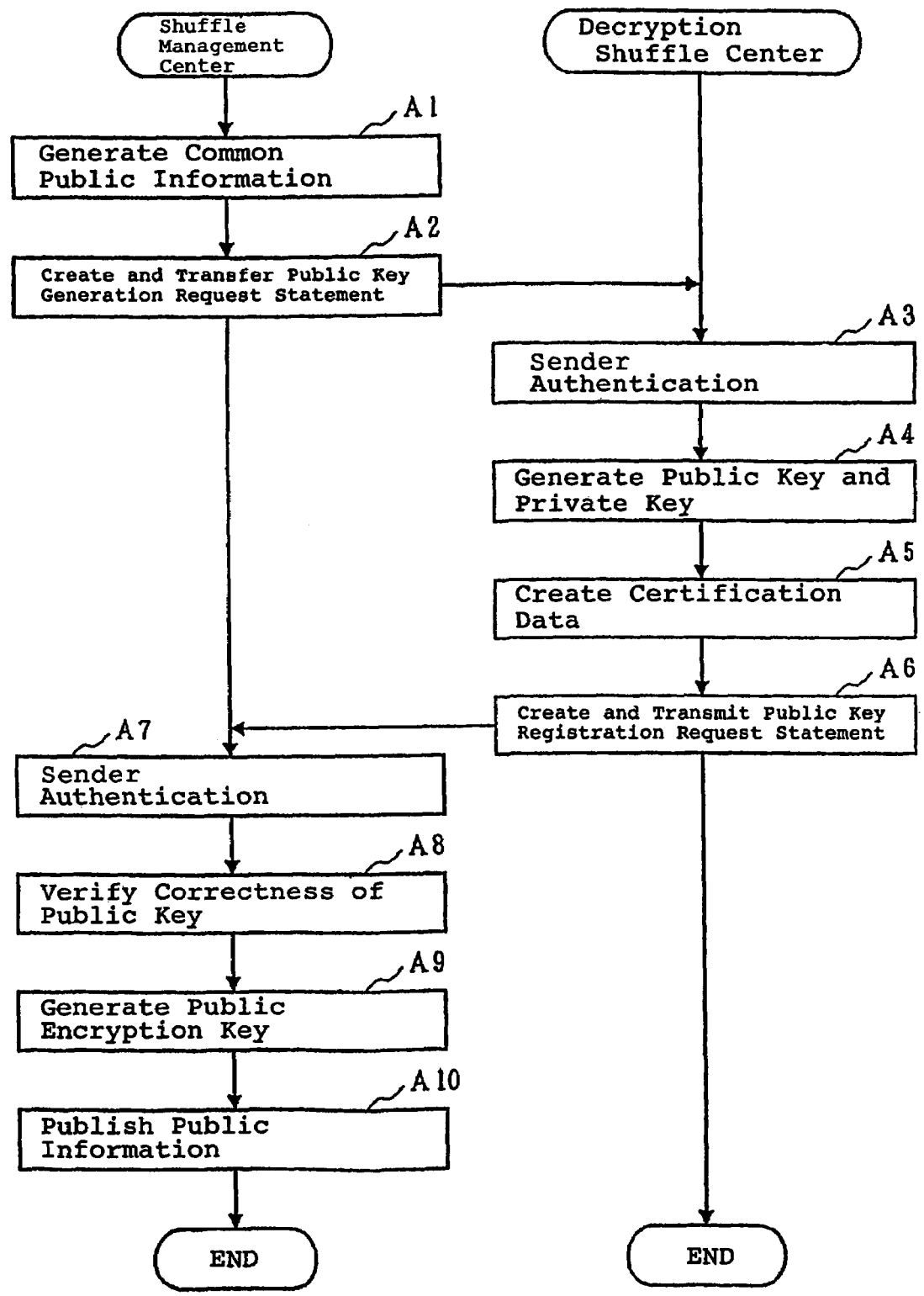
FIG. 4 is a flow chart showing an example of the processing when making initial settings.

First, regarding the initial setting process, when security parameters (pL, qL, t) to which a session ID has been added are received as input from the outside, management-side initial setting means 11 in shuffling management center 10 generates common public information (p, q, g) (FIG. 4, A1).

Here, p and q are parameters of an ElGamal cryptosystem and are two prime numbers in a relation such that p=kq+1, where k is a particular integer. The variable g is a generator for generating subgroups of order q in modulo p. In addition, pL and qL are the lengths of prime numbers p and q, respectively, and t is the number of repetitions used when generating certification data for certifying that an order-switching process (to be explained) is correct and when verifying the above-described certification data. The session ID is an identifier for specifying the object of processing, and the object of processing is, for example, the election of a prefectural governor or the election of the members of a city assembly.

Management-side initial setting means 11 then produces a request statement for generation of a public key that includes common public information (p, q, g), attaches the digital signature of shuffling management center 10 and session ID to this request statement, and then transfers the statement to all decryption shuffle centers 20-1 to 20-m (A2).

Shuffle-side initial setting means 21 in each of decryption shuffle centers 20-1 to 20-m carry out sender authentication by verifying the digital signature that is attached to the request statement for generation of a public key (A3). If the signature is not correct, shuffle-side initial setting means 21 takes action such as terminating the process. On the other hand, if the signature is correct, shuffle-side initial setting means 21 authenticates the correctness of common public information (p, q, g). In other words, shuffle-side initial setting means 21 investigates whether (p, q, g) satisfy the relation that is described in paragraph [0026]. If the correctness cannot be confirmed, shuffle-side initial setting means 21 takes action such as terminating the process. On the other hand, if shuffle-side initial setting means 21 can confirm correctness, shuffle-side initial setting means 21 generates a public key and an decryption key (private key) based on common public information (p, q, g) and stores these keys in correspondence with the session ID inside its own decryption shuffle center (A4). For example, in decryption shuffle center 20-j, which is j-th in processing priority, randomly selects $x_j$ mod q and takes this as the decryption key. The public key $y_j$ of this decryption shuffle center 20-j is generated from:

$$y_j = g^{x_j} \bmod p$$

Shuffle-side initial setting means 21 in each of decryption shuffle centers 20-1 to 20-m then generate certification data that each decryption shuffle center knows the decryption key for the public key that was generated in Step A4 (A5). For example, shuffle-side initial setting means 21 in decryption shuffle center 20-j, which is j-th in processing priority, generates certification data $y'_j$, $r_j$ certifying that decryption key $x_j$ for public key $y_j$ is known by means of:

$$y'_j = g^{\beta_j} \bmod p$$

$$c_j = \text{Hash}(p,q,g,y_j,y'_j)$$

$$r_j = c_j x_j + \beta_j \bmod q$$

where Hash is a secure Hash function and $\beta_j$ is a random number. When the process of Step A5 has been completed, shuffle-side initial setting means 21 in each of decryption shuffle centers 20-1 to 20-m produces a public key registration request statement that includes the public key that was generated in Step A4 and the certification data that were generated in Step A5, attaches the digital signature of its own decryption shuffle center and a session ID to this request statement, and returns the statement to shuffling management center 10 (A6).

Management-side initial setting means 11 in shuffling management center 10 carries out sender authentication by verifying the digital signature that is attached to the public key registration request statement that is returned from each of decryption shuffle centers 20-1 to 20-m (A7); and further, verifies the correctness of the public keys that are returned from each of decryption shuffle centers 20-1 to 20-m by means of the following equations (A8):

$$c_j = \text{Hash}(p,q,g,y_j,y'_j)$$

$$g^{r_j} y_j^{-c_j} = y'_j \bmod p$$

$$y_j^q = 1 \bmod p$$

When all of the public key registration request statements that have been returned from decryption shuffle centers 20-1 to 20-m have passed the verification of Steps A7 and A8, public keys $y_1$ to $y_m$ that have been returned from each of decryption shuffle centers 20-1 to 20-m are combined by:

$$Y = \prod_{j=1}^{m} y_j \bmod p$$

to generate public encryption key Y that is used when system users encrypt data (A9).

Management-side initial setting means 11 then generates public information that includes public encryption key Y, public keys $y_1$ to $y_m$ of each of decryption shuffle centers 20-1 to 20-m, common public information (p, q, g), and decryption shuffle center IDs of each of decryption shuffle centers 20-1 to 20-m (to inform system users of the organization that is in charge of decryption), and publishes this public information in correspondence with the session ID (A10). This completes the initial setting process.

Explanation next regards the decryption process.

Encrypted data list $\{(G_i, M_i)\}_{(i=1, 2, \ldots, n)}$ containing n items of encrypted data is applied as input from the outside to decryption control means 12 in shuffling management center 10. Session ID for specifying the object of processing to which these data are relevant is attached to this encrypted data list.

Encrypted data $(G_i, M_i)$ are encrypted data that correspond to data $m_i$ and are obtained from:

$$(G_i, M_i) = (g^{r_i}, m_i Y^{r_i}) \bmod p$$

where data $m_i$ are selected such that the order is q. In addition, $r_i$ is a random number arbitrarily selected for data $m_i$.

Figure 5:
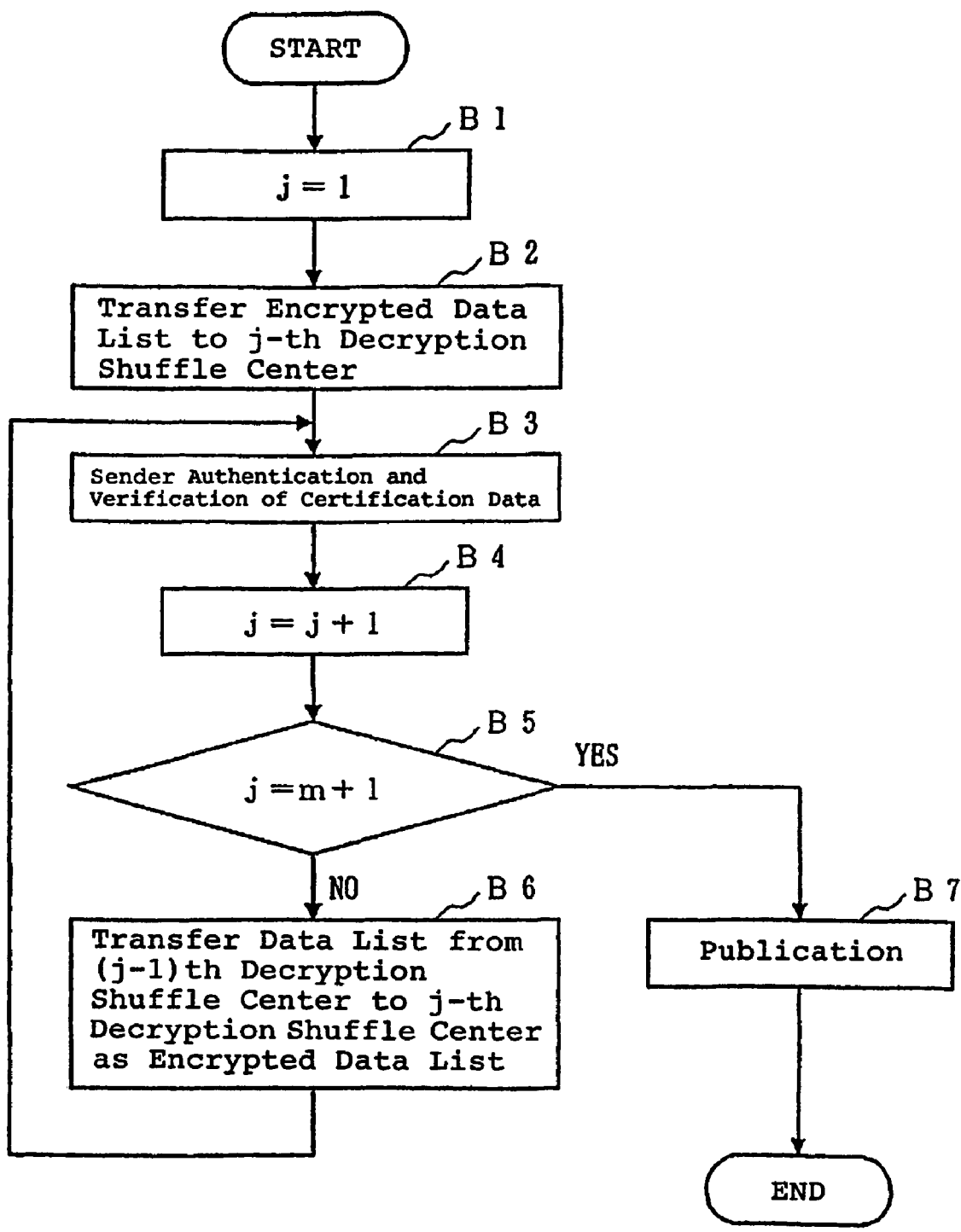
FIG. 5 is a flow chart showing an example of the processing of decryption control means 12.

When encrypted data list $\{(G_i, M_i)\}_{(i=1, 2, \ldots, n)}$ is received as input, decryption control means 12 in shuffling management center 10 first confirms that the order of $G_i$ and $M_i$ is q for all i, and then attaches the session ID and the digital signature of shuffling management center 10 to the encrypted data list and transfers the encrypted data list to decryption shuffle center 20-1, which is first in processing priority (B1 and B2 in FIG. 5). The encrypted data list that is transferred to decryption shuffle center 20-j, which is j-th in the processing priority, is represented by $\{(G^{(j)}_i, M^{(j)}_i)\}_{(i=1, 2, \ldots, n)}$.

Figure 6:
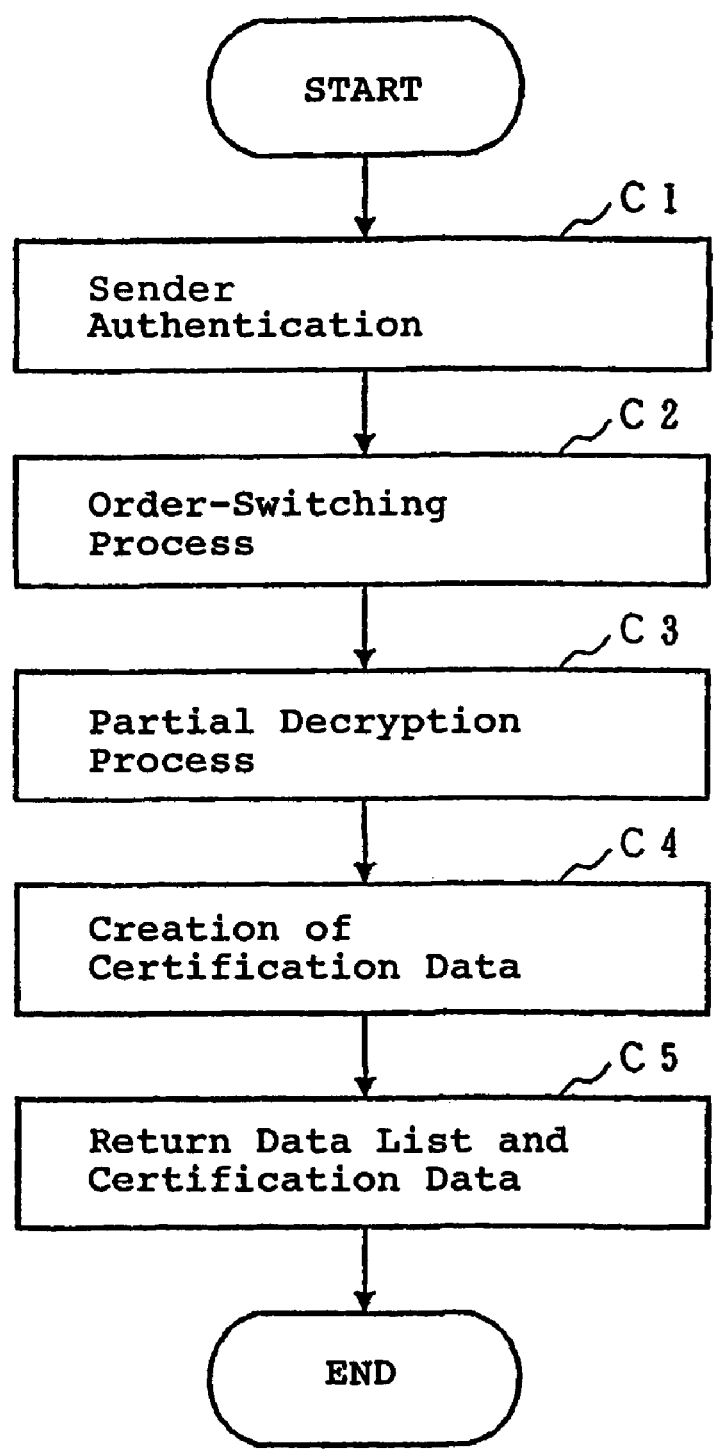
FIG. 6 is a flow chart showing an example of the processing of decryption shuffle centers 20-1 to 20-m.

Decryption shuffle center 20-1 performs sender authentication by verifying the digital signature that is attached to encrypted data list $\{(G^{(1)}_i, M(1)_i)\}_{(i=1, 2, \ldots, n)}$ (C1 in FIG. 6). If the digital signature is correct, shuffling means 22 and partial decryption means 23 are used to subject the above-described encrypted data list to an order-switching process and a partial decryption process to obtain a data list that is the processing result (C2 and C3). The details of the order-switching process and partial decryption process will be explained hereinbelow. Certification means 24 is then used to generate certification data indicating that the processes carried out by shuffling means 22 and partial decryption means 23 are correct (C4). The digital signature and the session ID are then attached to the data list and certification data, and the data list and certification data are returned to shuffling management center 10 (C5). The certification data may be attached to the data list and then returned to shuffling management center 10, or only the data list may be returned first and the certification data returned separately at a later time. Details regarding the method of generating the certification data will be explained hereinbelow.

When the certification data and data list with attached digital signature and Session ID are returned from decryption shuffle center 20-1, decryption control means 12 in shuffling management center 10 both carries out sender authentication and verifies the certification data based on the digital signature (B3 in FIG. 5). Details regarding the method of verifying the certification data will be explained hereinbelow. If the digital signature and certification data are correct, the data list that has been returned from decryption shuffle center 20-1, which is first in processing priority, is transferred as an encrypted data list to decryption shuffle center 20-2, which is second in processing priority (B4 to B6). At this time, decryption control means 12 adds the session ID to the encrypted data list.

At decryption shuffle center 20-2, the same processes are carried out as in decryption shuffle center 20-1 (C1 to C5 in FIG. 6), and the certification data and data list to which the digital signature and session ID have been attached are returned to shuffling management center 10.

In this way, decryption control means 12 in shuffling management center 10 carries out the same processes as the previously described processes (B3 to B6 in FIG. 5). The above-described processing is performed repeatedly until the certification data and data list to which are attached the digital signature and session ID are returned from decryption shuffle center 20-m, which is last in the processing priority, whereupon decryption control means 20 publishes the above-described data list as the decryption result list (B7). At this time, the decryption shuffle center IDs of decryption shuffle centers 20-1 to 20-m, the shuffling management center ID of shuffling management center 10, the session IDs, and each of the items of certification data that have been returned from each of decryption shuffle centers 20-1 to 20-m are published.

Explanation next regards the details of the order-switching process that is carried out by shuffling means 22, the partial decryption process that is carried out by partial decryption means 23, the certification data generation process that is carried out by certification means 24, and the verification process that is carried out by decryption control means 12.

Order-Switching Process

Explanation regards the order-switching process that is carried out by shuffling means 22 in decryption shuffle center 20-j, which is j-th in processing priority. The order-switching process is made up by a shuffling process and a re-encryption process that are described hereinbelow.

Shuffling means 22 first carries out a shuffling process. In the shuffling process, shuffling means 22 randomly determine permutation mapping $\pi^{(j)}$ for encrypted data $(G^{(j)}_i,$ $M^{(j)}_i)_{(i=1, 2, \ldots, n)}$ in the encrypted data list $\{(G^{(j)}_i, M^{(j)}_i)\}_{(i=1, 2, \ldots, n)}$ which has been transmitted from shuffling management center 10, switch the order of $(G^{(j)}_i, M^{(j)}_i)_{(i=1, 2, \ldots, n)}$ on the basis of the permutation mapping, and then obtain:

$$\{(\overline{G^{(j)}_i}, \overline{M^{(j)}_i})\}_{(i=1, 2, \ldots, n)}$$

This is the shuffling process.

$$\{(\overline{G^{(j)}_i}, \overline{M^{(j)}_i})\} = \{(G^{(j)}_{\pi(j)(i)}, M^{(j)}_{\pi(j)(i)})\}_{(i=1, 2, \ldots, n)}$$

is now realized.

The re-encryption process is carried out after the shuffling process has been completed. Re-encryption involves changing the appearance of the encrypted data without changing the content of the encrypted data. Re-encryption is necessary because merely changing the positions still allows the possibility of tracking the encrypted data from the bit pattern of the encrypted data.

Shuffling means 22 in decryption shuffle center 20-j, which is j-th in the processing priority combines the public keys of the decryption shuffle centers that come after decryption shuffle center 20-j to find:

$$Y_j = \prod_{l=j}^{m} y_l \bmod p$$

A random number $s^{(j)}_i \bmod q$ is generated for $\{(\overline{G^{(j)}_i}, \overline{M^{(j)}_i})\}_{(i=1, 2, \ldots, n)}$ which has undergone the shuffling process, whereby $\{(G'^{(j)}_i, M'^{(j)}_i)\}_{(i=1, 2, \ldots, n)}$ is found by means of:

$$G'^{(j)}_i = \overline{G^{(j)}_i} \cdot g^{s^{(j)}_i} \bmod p$$

$$M'^{(j)}_i = \overline{M^{(j)}_i} \cdot Y^{s^{(j)}_i} \bmod p$$

The generation of $Y_j$ and random number $s^{(j)}_i$ and the calculation of $g^{s^{(j)}_i}$, $Y^{s^{(j)}_i}$ can be carried out by calculation before the encrypted data list is received. If the values that have been calculated beforehand are stored, this re-encryption process can be realized by a single multiplication process for each data component.

Partial Decryption Process

Explanation next regards the partial decryption process that is carried out by partial decryption means 23 in decryption shuffle center 20-j.

Partial decryption means 23 uses decryption key $x_j$ (a decryption key that corresponds to the session ID that is attached to the encrypted data list) possessed by its own decryption shuffle center 20-j on $\{(G'^{(j)}_i, M'^{(j)}_i)\}_{(i=1, 2, \ldots, n)}$ that has undergone the order-switching process by shuffling means 22 to calculate:

$$M''^{(j)}_i = M'^{(j)}_i / (G'^{(j)}_i)^{x_j} \bmod p$$

$$G''^{(j)}_i = G'^{(j)}_i$$

Next, $\{(G''(j)_i, M''^{(j)}_i)\}_{(i=1, 2, \ldots, n)}$ is returned to shuffling management center 10 as the data list.

Certification Data Generation Process

Explanation next regards the process of generating certification data by certification means 24. In the following explanation, the notation (j) for identifying the decryption shuffle center is omitted.

Explanation first regards the method for generating certification data for certificating the generation of $\{(G^{(j)}_i, M^{(j)}_i)\}_{(i=1, 2, \ldots, n)}$ while keeping permutation mapping π and random number sequence $\{s_i\}$. Here, $\{(G^{(j)}_i, M^{(j)}_i)\}_{(i=1, 2, \ldots, n)}$ is generated by the shuffling means which carry out the shuffling process for the data list $\{(G'^{(j)}_i, M'^{(j)}_i)\}_{(i=1, 2, \ldots, n)}$ by using permutation mapping π and use the public key information (p, q, g) and the random number sequence $\{s_i\}_{(i=1, 2, \ldots, n)}$. In the following description, t represents a security parameter (repetition number).

1. t pieces of random permutation mappings $\pi'_u$ and t×n pieces of random numbers $\{s'_{(u,v)}\}$ are generated to calculate:

$$A_{u,v} = G_{\pi'_u(v)} \cdot g^{s'(u,v)} \bmod p$$

$$B_{u,v} = M_{\pi'_u(v)} \cdot Y_j^{2'(u,v)} \bmod p$$

for u=1, 2, . . . , t, and v=1, 2, . . . , n.

2. The following calculation is carried out:

$$c = \text{Hash}(p\|q\|g\|Y_j\|\{(G_i, M_i)\}_{(i=1, 2, \ldots, n)} \| \{(G'_i, M'_i)\}_{(i=1, 2, \ldots, n)}\|$$

$$\{(A_{(u,v)}, B_{(u,v)})\}_{(u=1, 2, \ldots, t, v=1, 2, \ldots, n)})$$

Here, ∥ represents connection.

3. Representing u-th (u=1, 2, . . . , t) bit of c as c[u], the following calculation is carried out:

$$\alpha_u = \pi'_u \text{ and } \beta_{u,v} = s'_{(u,v)}, \text{ when } c[u]=0; \text{ and}$$

$$\alpha_u = \pi^{-1} \circ \pi'_u \text{ and } \beta_{(u,v)} = s'_{(u,v)} - s_{(\pi^{-1} \circ \pi'_v(u))}, \text{ when } c[u]=1.$$

The generation of permutation mappings $\pi'_u$ and random numbers $\{s'_{(u,v)}\}$ and the calculation of $g^{s'(u,v)}$, $Y_j^{s'(u,v)}$ can be carried out by calculation before the encrypted data list is received. If the values that have been calculated beforehand are stored, the processing time can be reduced.

Explanation next regards the method of generating certification data for certifying that $\{(G''_i, M''_i)\}_{(i=1, 2, \ldots, n)}$, which has been correctly calculated by using private key x that corresponds to one's own public key y on the above-described $\{(G'_i, M'_i)\}_{(i=1, 2, \ldots, n)}$ has been sent to shuffling management center 10 without revealing private key x.

1. Random number r mod q is generated.
2. The following calculation is carried out:

$$c = \text{Hash}(p\|q\|g\|y\|\{G'_i\}_{(i=1, 2, \ldots, n)}\|\{(M'_i/M''_i)\}_{(i=1, 2, \ldots, n)}\|$$

$$g^r\|\{G''_i\}_{(i=1, 2, \ldots, n)})$$

3. Calculate α=r−cx mod q. c and α that have been found as shown above are the certification data.

Verification Process

Explanation next regards the verification process that is carried out by decryption control means 12. Explanation first regards the verification of certification data for certifying that the process of shuffling means 22 is correct.

1. The following calculations are carried out based on the published information and certification data:

$$c = \text{Hash}(p\|q\|g\|Y_j\|\{(G_i, M_i)\}_{(i=1, 2, \ldots, n)}\|\{(G'_i, M'_i)\}_{(i=1, 2, \ldots, n)}\|$$

$$\{(A_{(u,v)}, B_{(u,v)})\}_{(u=1, 2, \ldots, t, v=1, 2, \ldots, n)})$$

2. If the u-th bit (where u=1, 2, . . . , t) of c is c[u], it is checked whether the following relation is realized when c[u]=0:

$$A_{u,v} = G_{\alpha_u(v)} \cdot g^{\beta(u,v)} \bmod p$$

$$B_{u,v} = M_{\alpha_u(v)} \cdot Y_j^{\beta(u,v)} \bmod p$$

The realization of the following relation when c[u]=1 is checked.

$$A_{u,v} = G'_{\alpha_u(v)} \cdot g^{\beta(u,v)} \bmod p$$

$$B_{u,v} = M'_{\alpha_u(v)} \cdot Y_j^{\beta(u,v)} \bmod p$$

3. It is checked whether the order of $G'_i$, $M'_i$ is q. When all relations have been confirmed, the certification data are considered to be correct.

Explanation next regards the verification of the certification data that certify that the process carried out by partial decryption means 23 is correct.

1. It is first checked whether $G'_i = G''_i$ for all i.
2. It is then checked whether:

$$c = \text{Hash}(p\|q\|t\|y\|\{G'_i\}_{(i=1, 2, \ldots, n)} \| \{(M'_i/M''_i)\}_{(i=1, 2, \ldots, n)}\|g^{\alpha} \cdot y^c\|\{G'^{\alpha}_i \cdot (M'_i/M''_i)^c\}_{(i=1, 2, \ldots, n)})$$

is realized.

3. It is then checked whether $M''^q_i = 1$ mod p for all i.

If all relations are confirmed, the certification data are considered to be correct.

The shuffle certification and decryption certification are in fact carried out at the same time, and there is consequently no need to send $\{G'_i\}_{(i=1, 2, \ldots, n)}$ that is to be $G'_i = G''_i$ for $\{G''_i\}_{(i=1, 2, \ldots, n)}$ that is given as the result of decryption. Thus, in actual implementation, only $\{M'_i\}_{(i=1, 2, \ldots, n)}$ is sent when certifying shuffling.

Although omitted in the foregoing explanation of operations, the ID of the shuffling management center or decryption shuffle center that is the transmission destination of data and the ID of the shuffling management center or decryption shuffle center that is the transmission source are added when data are exchanged between the shuffling management center and decryption shuffle centers. For example, when transferring data from shuffling management center 10 to decryption shuffle center 20-1, the IDs of decryption shuffle center 20-1 and shuffling management center 10 are added as the transfer destination and transfer source, respectively. As another example, when data are transmitted from shuffling management center 10 to all decryption shuffle centers 20-1 to 20-m, the IDs of all decryption shuffle centers 20-1 to 20-m and the ID of shuffling management center 10 are added as the transmission destinations and the transmission source.

Figure 7:
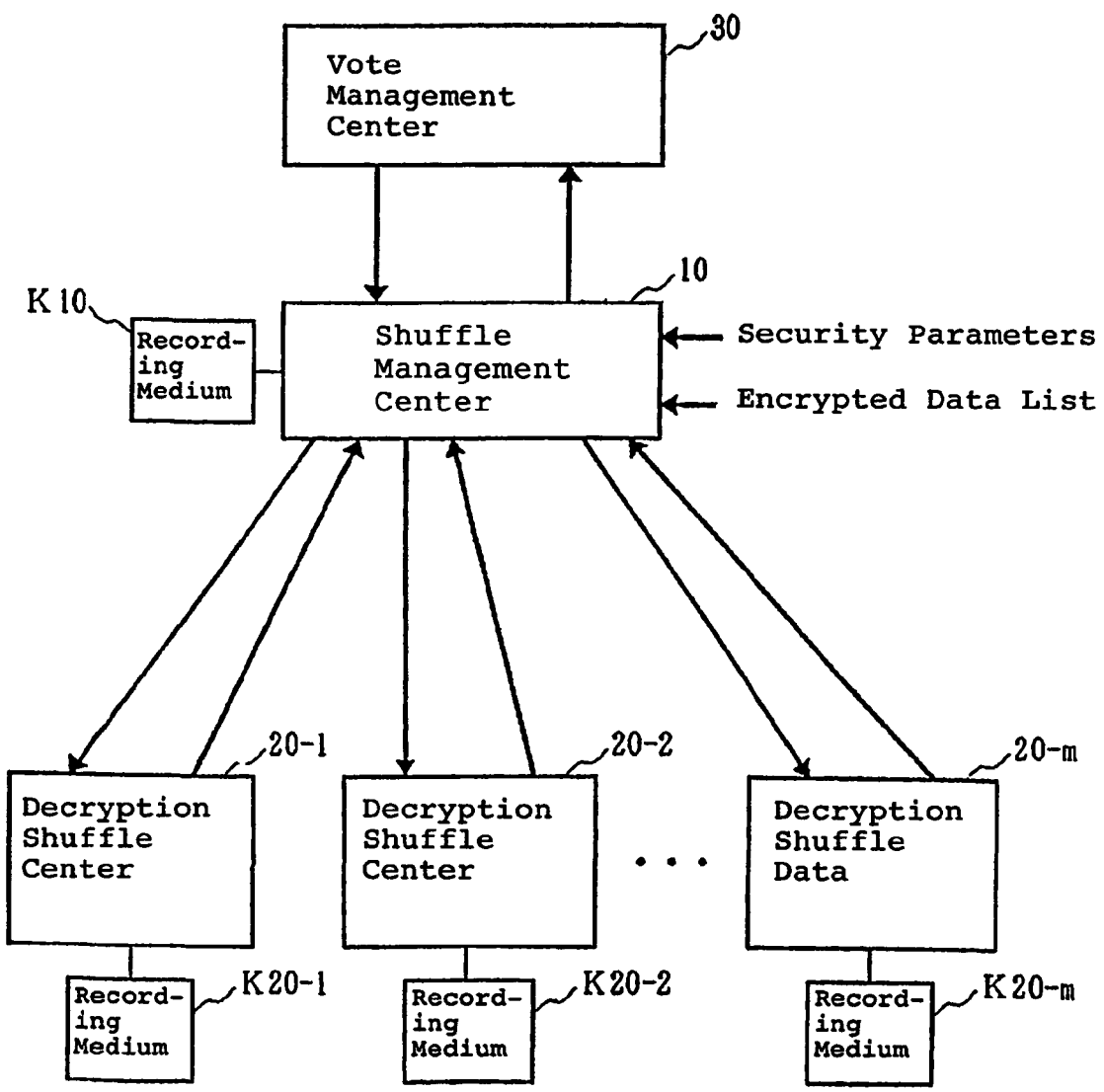
FIG. 7 is a block diagram showing an example of the construction of the second embodiment of the present invention.

We next refer to FIG. 7 to describe the second embodiment of the present invention. This embodiment is suitable for use when casting anonymous electronic ballots, and vote management center 30 is added to the construction that is provided for the anonymous decryption system that is shown in FIG. 1.

A list of registered voters, security parameters, the voting period of the election, and session ID are applied as input to vote management center 30. Vote management center 30 adds the above-described session ID to the above-described security parameters and transfers them to shuffling management center 10.

When the security parameters with the added session ID are sent in from vote management center 30, shuffling management center 10 carries out the previously described initial setting process (refer to FIG. 4) in concert with each of decryption shuffle centers 20-1 to 20-m and publishes the obtained public information (which includes, for example, the public keys and common public information p, q, and g). Vote management center 30 checks whether this public information is correct in accordance with the security parameters and then notifies each voter.

When the voting period begins, the voters encrypt their own voting data based on the public information, add their voter digital signatures, and send the data to vote management center 30. Here, the i-th (where i=1, 2, . . . , n) voter uses the published public key Y and common public information (p, q, g) to encrypt vote content $m_i$ as shown below. In this case, it is assumed that the vote content is selected such that the order is q.

The voter first selects any random number $r_j$ mod q. Next, $(G_i, M_i)$ obtained by:

$$(G_i, M_i) = (g^{r_i}, m_i Y^{r_i}) \bmod p$$

are taken as the encrypted vote data. These encrypted vote data are sent to vote center 30 with the voter's own digital signature attached.

It can here be certified that the voter has prepared the encrypted vote data knowing the correct $m_i$. For example, the i-th voter generates random number y and then generates certification data $\alpha$ and $t_i$ by means of:

$$\alpha_i = g^{\gamma_i} \bmod p$$

$$c_i = \mathrm{Hash}(p, q, g, G_i, \alpha_i)$$

$$t_i = c_i r_i + \gamma_i \bmod q$$

This certification can be verified by means of:

$$c_i = \mathrm{Hash}(p, q, g, G_i, \alpha_i)$$

$$g^{t_i} G_i^{-c_i} = \alpha_i \bmod p$$

Alternatively, the i-th voter may also generate random number γ and then generate certification data $\alpha$ and $t_i$ by means of:

$$\alpha_i = g^{\gamma_i} \bmod p$$

$$c_i = \mathrm{Hash}(p, q, g, G_i, \alpha_i)$$

$$t_i = \gamma_i - c_i r_i \bmod q$$

This certification can be verified by means of:

$$c_i = \mathrm{Hash}(p, q, g, G_i, \alpha_i)$$

$$g^{t_i} G_i^{c_i} = \alpha_i \bmod p$$

Vote management center 30 accepts the ballots after verifying the signatures, confirming the voters' voting rights based on the registered voter list, and checking for double voting. When certification data have been added, vote management center 30 accepts the ballots after additionally verifying the certification data. When the voting period ends, vote management center 30 stops accepting ballots, and sends the encrypted vote data that have been accepted as an encrypted data list with digital signatures attached to shuffling management center 10 of the anonymous decryption system. Upon receiving the encrypted data list, shuffling management center 10 decrypts the data list by means of the previously described decryption process, and returns the decryption results and certification data to vote management center 30.

Vote management center 30 collects the decryption results that it has received as post-decryption voting data and announces the results.

Figure 8:
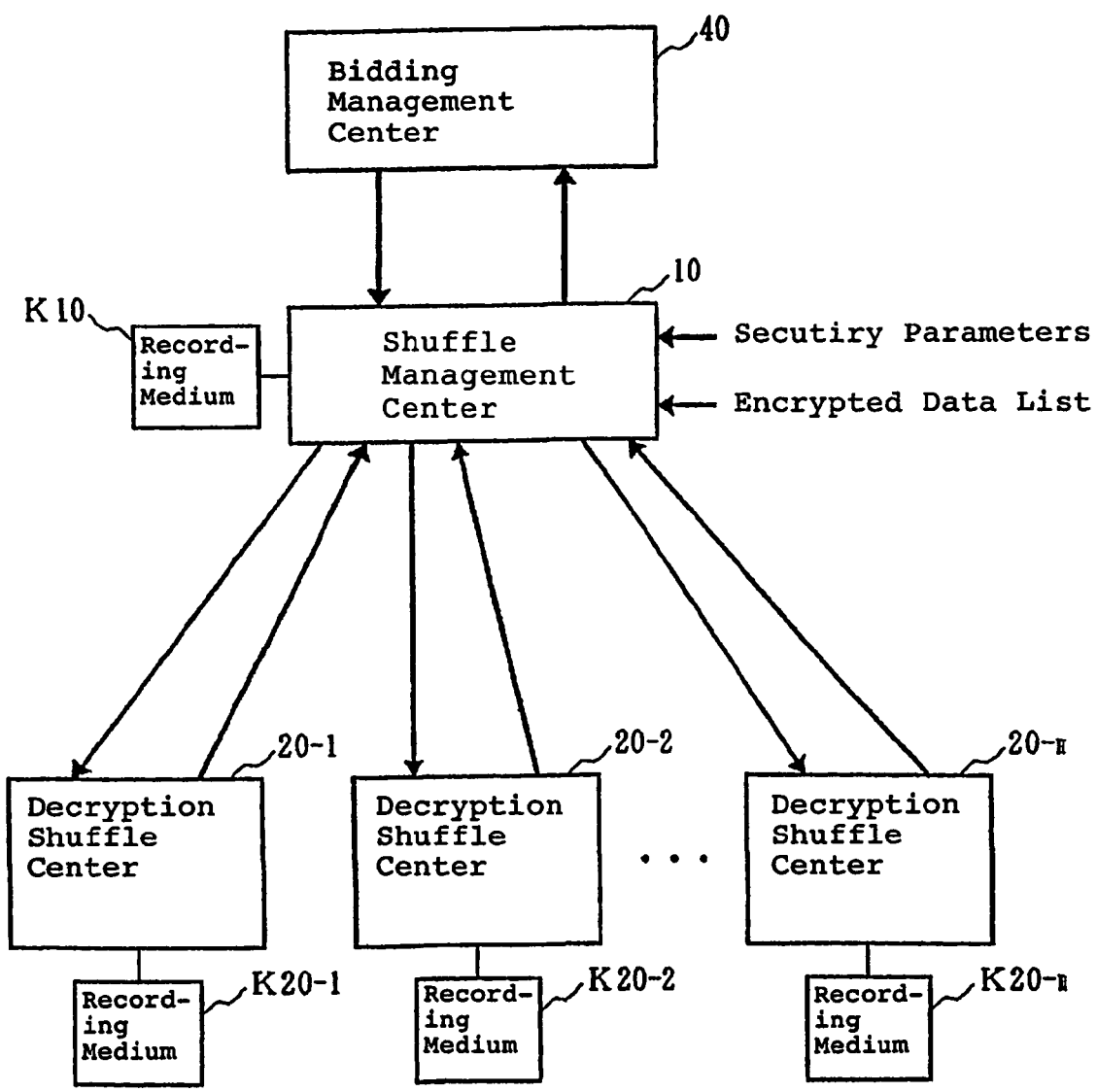
FIG. 8 is a block diagram showing an example of the construction of the third embodiment of the present invention.

Next referring to FIG. 8 to describe the third embodiment of the present invention. The present embodiment is suitable for use in anonymous electronic bidding, and a bidding management center 40 has been added to the construction that is provided for the anonymous decryption system shown in FIG. 1.

A bidders list, security parameters, bidding period, and session ID are applied as input to bidding management center 40. Bidding management center 40 adds the above-described session ID to the above-described security parameters and transfers them to shuffling management center 10.

When the security parameters with the added session ID are sent in from bidding management center 40, shuffling management center 10 carries out the previously described initial setting process (refer to FIG. 4) in concert with each of decryption shuffle centers 20-1 to 20-m and publishes the obtained public information (which includes, for example, the public keys Y and common public information p, q, and g). Bidding management center 40 checks whether this public information is correct in accordance with the security parameters and then notifies each bidder.

When the bidding period begins, the bidders encrypt their own bid values based on the public information, add their bidder digital signatures, and send the data to bidding management center 40. Certification data for certifying that the bidders knows their own bid values (certification data that are similar to the certification data described in the second embodiment) may be transmitted at this time.

Bidding management center 40 accepts the bids after verifying the signatures, confirming the bidders' rights to bid based on the bidders list, and checking for double bidding. When certification data have also been sent, bidding management center 40 accepts the bids after additionally verifying the certification data. When the bidding period ends, bidding management center 40 stops accepting bids, and sends the encrypted bid values that have been accepted as an encrypted data list to shuffling management center 10 of the anonymous decryption system. Upon receiving the encrypted data list, shuffling management center 10 decrypts the data list by means of the previously described decryption process, and returns the decryption results and certification data to bidding management center 40.

Bidding management center 40 announces the decryption results that it has received as post-decryption bid values.

Figure 9:
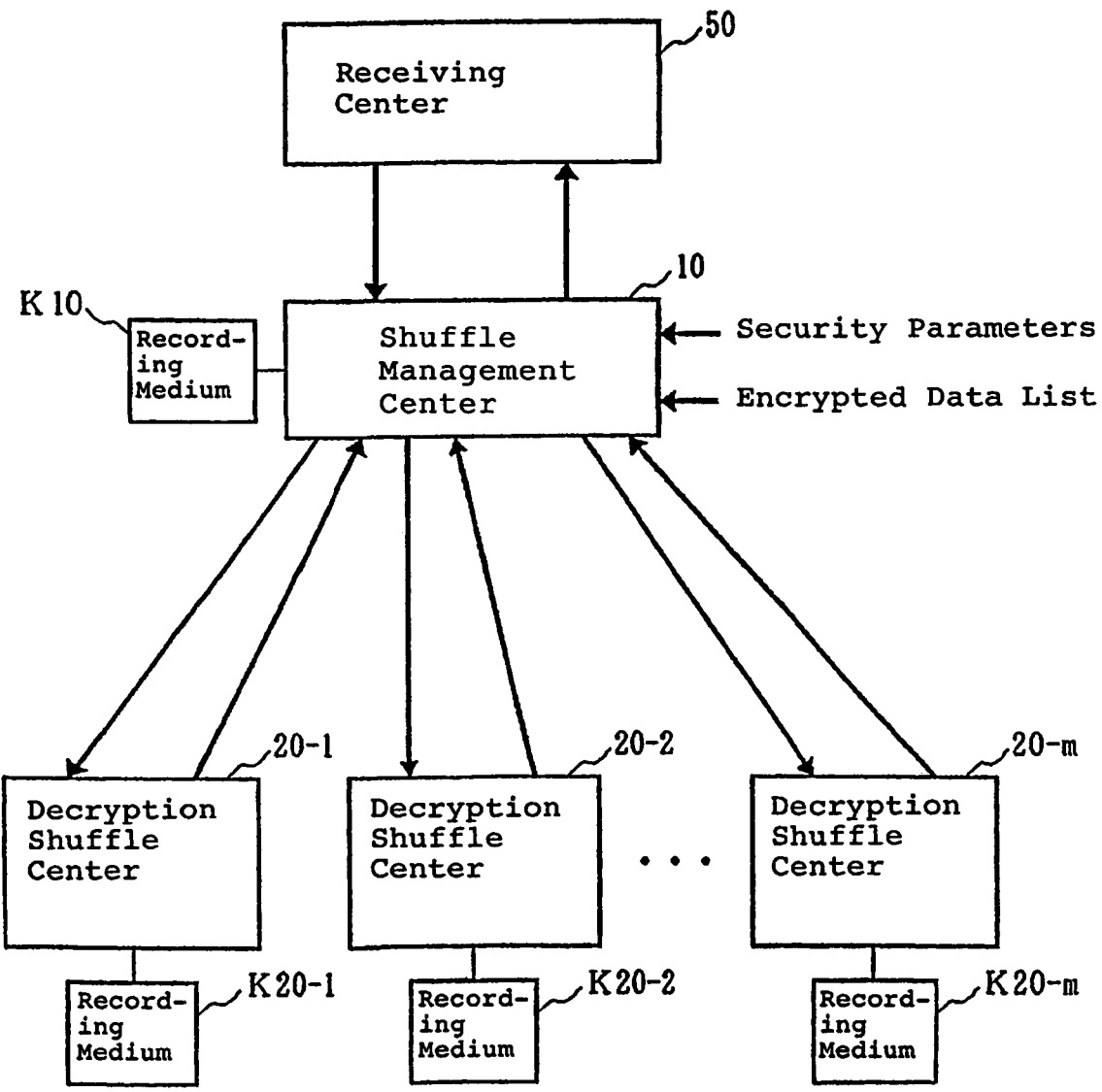
FIG. 9 is a block diagram showing an example of the construction of the fourth embodiment of the present invention.
Figure 10:
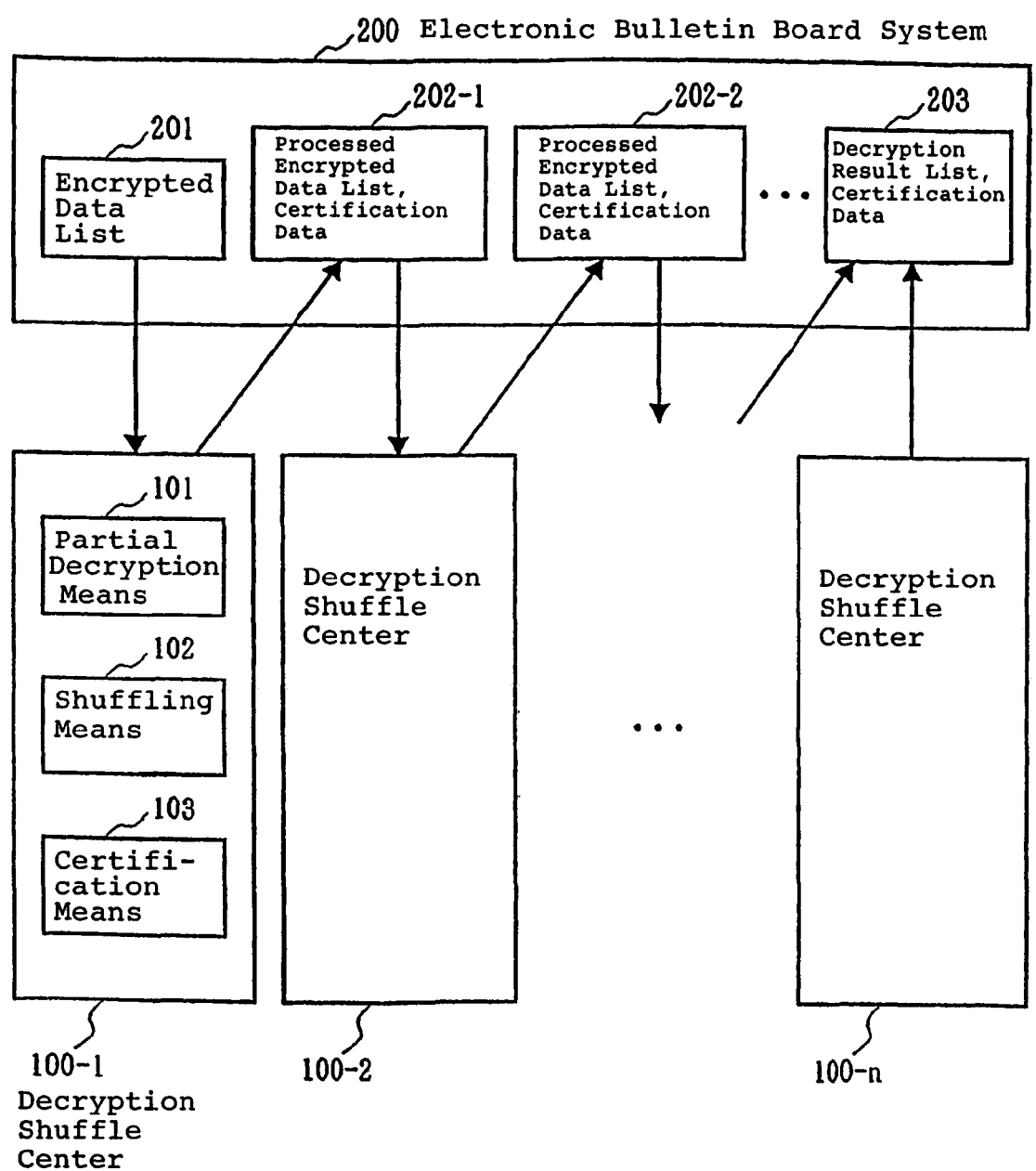
FIG. 10 is a block diagram for explaining the prior art.

Next referring to FIG. 9 to describe the fourth embodiment of the present invention. The present embodiment is suitable for use when conducting an anonymous electronic survey, and receiving center 50 has therefore been added to the construction that is provided for anonymous decryption system shown in FIG. 1.

A respondent list, security parameters, survey period, and session ID are applied as input to receiving center 50. Receiving center 50 adds the above-described session ID to the above-described security parameters and transfers them to shuffling management center 10.

When the security parameters with the added session ID are sent in from receiving center 50, shuffling management center 10 carries out the previously described initial setting process (refer to FIG. 4) in concert with each of decryption shuffle centers 20-1 to 20-m and publishes the obtained public information (which includes, for example, the public keys Y and common public information p, q, and g). Receiving center 50 checks whether this public information is correct in accordance with the security parameters and then notifies each survey respondent.

When the survey period begins, the respondents encrypt their own survey responses based on the public information, add their respondent digital signatures, and send the data to receiving center 50. Certification data for certifying that the respondents know their own survey responses (certification data that are similar to the certification data described in the second embodiment) may be transmitted at this time.

Receiving center 50 accepts the survey responses after verifying the signatures, confirming the respondents' right to respond based on the respondent list, and checking for double responses. When certification data have also been sent, receiving center 50 accepts the survey responses after additionally verifying the certification data. When the survey period ends, receiving center 50 stops accepting survey responses, and sends the encrypted survey responses that have been accepted as an encrypted data list to shuffling management center 10 of the anonymous decryption system. Upon receiving the encrypted data list, shuffling management center 10 decrypts the data list by means of the previously described decryption process, and returns the decryption results and certification data to receiving center 50.

Receiving center 50 announces the decryption results that it has received as survey responses after decryption.

In addition to the described embodiments, the convenient verification of the correctness of information or data that are published by a center or third party can also be considered. In addition, the numerical formulas relating to the certification method are only one example, and an expert in the art can easily arrive at modifications of the formulas that would produce the same results.

Potential for Application in Industry

As described in the foregoing explanation, the present invention enables the decryption of an encrypted data list by merely exchanging data between a shuffling management center and decryption shuffle centers and thus has the merit of eliminating the need for the complex management processing such as in the anonymous decryption system of the prior art that uses an electronic bulletin board system.

In the present invention, moreover, the shuffling management center and decryption shuffle centers generate public information that includes public keys for encryption in concert based on security parameters that are received as input from the outside, and as a result, the present invention has the further merit of enabling easier and more reliable initial setting operations.

Still further, a decryption shuffle center that manages the decryption key, which is the important secret, does not call for direct connection with an electronic bulletin board system that is in turn accessible by an unspecified large number of peoples, and the present invention is therefore extremely advantageous from the standpoint of security. Further, the construction of the decryption shuffle centers can be concentrated in only the processes relating to the decryption key and the functions for communication with the shuffling management center, and the present invention therefore has the further merit of enabling a decryption shuffle center to be realized in a compact package. Finally, the session management functions and decryption key management functions are shared between the shuffling management center and decryption shuffle centers, and as a result, not just one anonymous decryption but a plurality of instances of anonymous decryption processes are possible, and services such as electronic voting, electronic bidding, and electronic surveys can therefore be realized with a high level of security.

The invention claimed is:

1. An anonymous decryption system which takes as input an encrypted data list that includes a plurality of items of encrypted data that have been encrypted by a specified method and specified public information and which supplies results of decrypting each item of encrypted data without relation to order on the list; said anonymous decryption system comprising:
   a shuffling management center for, when an encrypted data list is received as input from the outside, transferring the encrypted data list to a decryption shuffle center, and when a data list is returned from said decryption shuffle center, supplying said data list as a decryption result list; and
   the decryption shuffle center for subjecting an encrypted data list which has been transferred from said shuffling management center to both an order-switching process using public information and a partial decryption process using a decryption key possessed by that decryption shuffle center and returning the resulting data list to said shuffling management center.

2. An anonymous decryption system which takes as input an encrypted data list that includes a plurality of items of encrypted data that have been encrypted by a specified method and specified public information and which supplies results of decrypting each item of encrypted data without relation to order on the list; said anonymous decryption system comprising:
   a shuffling management center for accepting an encrypted data list from the outside; and
   a plurality of decryption shuffle centers each possessing its own decryption key;
   wherein:
   said shuffling management center transfers an encrypted data which that it has received to a first decryption shuffle center;
   said first decryption shuffle center subjects the encrypted data list that it has received from said shuffling management center to both an order-switching process using corresponding public information and a partial decryption process using a corresponding decryption key and then returns resulting data list to said shuffling management center;
   said shuffling management center transmits the data list that has been returned from said first decryption shuffle center to a second decryption shuffle center; and
   said shuffling management center supplies the data list that is returned from a last decryption shuffle center as a decryption result list.

3. An anonymous decryption system which takes as input an encrypted data list that includes a plurality of items of encrypted data that have been encrypted by a specified method and specified public information and which supplies results of decrypting each item of encrypted data in the encrypted data list without relation to order on the list; said anonymous decryption system comprising:
   a shuffling management center, and a plurality of decryption shuffle centers each possessing its own decryption key;
   wherein:
   said shuffling management center comprises a construction that, when an encrypted data list is received as input from outside, transfers said encrypted data list to the decryption shuffle center that is first in processing priority; when a data list is returned from a decryption shuffle center other than the decryption shuffle center that is last in processing priority, transfers said data list that has been returned to a decryption shuffle center that is next in processing priority after the decryption shuffle center that returned said data list as an encrypted data list; and when a data list is returned from the decryption shuffle center that is last in processing priority, supplies said data list as a decryption result list; and each of said decryption shuffle centers comprises a construction that subjects an encrypted data list that is transferred in from said shuffling management center to both an order-switching process using public information and a partial decryption process using a decryption key possessed by that decryption shuffle center, and returns the data list resulting from this processing to said shuffling management center.

4. The anonymous decryption system according to claim 1, 2, or 3, wherein said decryption shuffle center comprises a construction for reporting to said shuffling management center certification that the order-switching process has been carried out correctly and that the partial decryption process has been carried out correctly.

5. The anonymous decryption system according to claim 1, 2, or 3, wherein said decryption shuffle center comprises a construction for attaching, to said data list that results from processing, certification that the order-switching process has been carried out correctly and the partial decryption process has been carried out correctly, and reporting to said shuffling management center.

6. The anonymous decryption system according to claim 4, wherein said shuffling management center comprises a construction for verifying that certification performed by a decryption shuffle center is correct.

7. The anonymous decryption system according to claim 4, wherein said shuffling management center comprises a construction for, after verifying that certification performed by a decryption shuffle center is correct, transferring a data list that has been returned from said decryption shuffle center to a decryption shuffle center having next processing priority as an encrypted data list.

8. The anonymous decryption system according to claim 4, wherein said shuffling management center comprises a construction for adding to said decryption result list certification that has been reported from all decryption shuffle centers and supplying a result as output.

9. The anonymous decryption system according to claim 1, 2, or 3, wherein said shuffling management center and said decryption shuffle center comprise constructions for carrying out authentication of a sender during communication.

10. The anonymous decryption system according to claim 1, 2, or 3, wherein said shuffling management center and said decryption shuffle center comprise constructions for adding to communication data a digital signature of a transmission source.

11. The anonymous decryption system according to claim 1, 2, or 3, wherein:

for the same object of processing, a common session ID is added to mutually relevant public information, encrypted data lists, and decryption keys that are possessed by decryption shuffle centers;

said shuffling management center comprises a construction for, when said shuffling management center transfers to a decryption shuffle center an encrypted data list that corresponds to a particular session ID, and when said shuffling management center transfers a data list to which a particular session ID is added and that has been returned from a decryption shuffle center to another decryption shuffle center as an encrypted data list, adding said particular session ID to said encrypted data list and transmitting a resulting data list to the decryption shuffle center; and said decryption shuffle center comprises a construction for, when an encrypted data list to which a particular session ID has been added is transferred in from said shuffling management center, carrying out an order-switching process using public information to which said particular session ID has been added, carrying out a partial decryption using a decryption key to which said particular ID has been added, adding said particular session ID to a resulting data list, and returning said data list to said shuffling management center.

12. The anonymous decryption system according to claim 1, 2, or 3, wherein:

said shuffling management center comprises a construction for, when a security parameter is received as input, generating common public information based on said security parameter; notifying all decryption shuffle centers of said generated common public information; and when public keys are returned from all decryption shuffle centers, both generating public encryption keys based on the public keys from all decryption shuffle centers and publishing public information that includes said generated public encryption keys and said common public information; and said decryption shuffle center comprises a construction for generating a public key and a decryption key based on common public information that is reported from said shuffling management center and returning said generated public key to said shuffling management center.

13. The anonymous decryption system according to claim 12, wherein said decryption shuffle center comprises a construction for, when returning a public key to said shuffling management center, adding certification that said public key has been correctly generated and returning said public key to said shuffling management center.

14. The anonymous decryption system according to claim 13, wherein said shuffling management center comprises a construction for verifying that a certificate that has been added to a public key is correct.

15. The anonymous decryption system according to claim 13, wherein said shuffling management center comprises a construction for publishing a public key and a certificate that has been added to said public key together with public information.

16. The anonymous decryption system according to claim 12, wherein said shuffling management center and said decryption shuffle center comprise constructions for carrying out sender authentication during communication.

17. The anonymous decryption system according to claim 12, wherein said shuffling management center and said decryption shuffle center comprise constructions for conferring a digital signature of a sender to communication data.

18. The anonymous decryption system according to claim 11, wherein said shuffling management center comprises a construction for adding, in addition to said session ID, a shuffling management center ID that is conferred to that shuffling management center, a decryption shuffle center ID that is conferred to a decryption shuffle center that is the transmission destination, and a signature of that shuffling management center when transferring an encrypted data list to a decryption shuffle center.

19. The anonymous decryption system according to claim 11, wherein said decryption shuffle center comprises a construction for adding, in addition to said session ID, a decryption shuffle center ID that is conferred to that decryption shuffle center, a shuffling management center ID that is conferred to said shuffling management center, and a signature of that decryption shuffle center when returning a data list to said shuffling management center.

20. The anonymous decryption system according to claim 19, wherein said decryption shuffle center comprises a construction for adding data certifying that the order-switching process has been carried out correctly and data certifying that the partial decryption process has been carried out correctly when returning a data list to said shuffling management center.

21. The anonymous decryption system according to claim 8, wherein information that is supplied as output by said shuffling management center comprises:
    a shuffling management center ID that is conferred to that shuffling management center,
    an encrypted data list that has been received as input from outside,
    a decryption result list for that encrypted data list,
    a session ID that is conferred to said encrypted data list,
    all data that have been returned from all decryption shuffle centers, and
    a signature of the shuffling management center.

22. The anonymous decryption system according to claim 12, wherein said shuffling management center comprises a construction for, when reporting common public information and security parameter to decryption shuffle centers, adding:
    a shuffling management center ID that is conferred to that shuffling management center;
    decryption shuffle center IDs of all decryption shuffle centers that perform decryption;
    the session ID; and
    a signature of that shuffling management center.

23. The anonymous decryption system according to claim 12 wherein said decryption shuffle center comprises a construction for adding to information that is returned to a shuffling management center:
    a shuffling management center ID that is conferred to said shuffling management center;
    the session ID;
    a decryption shuffle center ID of that decryption shuffle center; and
    a signature of that decryption shuffle center.

24. The anonymous decryption system according to claim 12, wherein the public information that said shuffling management center publishes comprises:
    a shuffling management center ID that is conferred to that shuffling management center;
    the session ID;
    a security parameter;
    a public encryption key;
    decryption shuffle center IDs of all decryption shuffle centers; and
    public keys that have been generated by all decryption shuffle centers.

25. The anonymous decryption system according to claim 4, wherein certification that is realized by a decryption shuffle center can be verified by a third party.

26. The anonymous decryption system according to claim 1, 2, or 3, wherein said decryption shuffle center comprises a construction for calculating a portion of data that are used in an order-switching process before input of an encrypted data list, and when an encrypted data list has been received as input, carrying out the order-switching process using the data that have been calculated in advance.

27. The anonymous decryption system according to claim 5, wherein said decryption shuffle center comprises a construction for calculating a portion of data that are used in generation of certification data for certifying that an order-switching process is correct before input of an encrypted data list, and when an encrypted data list is received as input, generating said certification data using data that have been calculated in advance.

28. An anonymous decryption system according to claim 1, comprising a vote management center which is provided for:
    accepting encrypted vote data that are sent from each voter, said encrypted vote data being vote data that have been encrypted based on said public information;
    from among the encrypted vote data, selecting legitimate encrypted vote data of legitimate voters; and
    transmitting the selected encrypted vote data as an encrypted data list to said shuffling management center.

29. The anonymous decryption system according to claim 28, wherein:
    each of said voters transmits to said vote management center certification data for certifying that vote data have been correctly encrypted; and
    said vote management center comprises a construction for verifying certification data that have been transmitted in from each voter.

30. An anonymous decryption system according to claim 1, comprising a bidding management center which is provided for:
    accepting encrypted bid values that are sent from each bidder and in which bid values have been encrypted based on said public information;
    selecting from among the received encrypted bid values legitimate encrypted bid values of legitimate bidders; and
    transmitting the selected encrypted bid values as an encrypted data list to said shuffling management center.

31. The anonymous decryption system according to claim 30, wherein:
    each of said bidders transmits to said bidding management center certification data for certifying that bid values have been correctly encrypted; and
    said bidding management center comprises a construction for verifying certification data that have been sent in from each bidder.

32. An anonymous decryption system according to claim 1, comprising a receiving center which is provided for:
    receiving encrypted survey responses that are sent in from each survey respondent and in which survey responses have been encrypted based on said public information;
    selecting from among the received encrypted survey responses legitimate encrypted survey responses of legitimate survey respondents; and
    transmitting the selected encrypted survey responses as an encrypted data list to said shuffling management center.

33. The anonymous decryption system according to claim 32, wherein
    said survey respondents transmit to said receiving center certification data for certifying that survey responses have been correctly encrypted; and
    said receiving center comprises a construction for verifying certification data that are sent from each survey respondent.

34. An anonymous decryption method which takes as input an encrypted data list that includes a plurality of items of encrypted data that have been encrypted by a specified method and specified public information and which supplies results of decrypting each item of encrypted data without relation to order on the list; said anonymous decryption method comprising steps wherein:

a shuffling management center, having received as input an encrypted data list from outside, transmits said encrypted data list to a decryption shuffle center;

said decryption shuffle center subjects the encrypted data list that has been transmitted in from said shuffling management center to an order-switching process using public information and a partial decryption process using a decryption key that said decryption shuffle center possesses and returns a resulting data list to said shuffling management center; and said shuffling management center, when a data list has been returned from said decryption shuffle center, supplies said data list as a decryption result list.

35. An anonymous decryption method which takes as input an encrypted data list that includes a plurality of items of encrypted data that have been encrypted by a specified method and specified public information and which supplies results of decrypting each item of encrypted data without relation to order on the list; said anonymous decryption method comprising steps wherein:

a shuffling management center transfers an encrypted data list that has been received from outside to a first decryption shuffle center;

said first decryption shuffle center subjects the encrypted data list that has been received from said shuffling management center to both an order-switching process using corresponding public information and a partial decryption process using a corresponding decryption key and returns a resulting data list to said shuffling management center;

said shuffling management center transmits the data list that has been returned from said first decryption shuffle center to a second decryption shuffle center; and said shuffling management center supplies a data list that has been returned from a last decryption shuffle center as a decryption result list.

36. An anonymous decryption method which takes as input an encrypted data list that includes a plurality of items of encrypted data that have been encrypted by a specified method and specified public information and which supplies results of decrypting each item of encrypted data in the encrypted data list without relation to order on the list; said anonymous decryption method comprising steps wherein:

a shuffling management center, having received as input an encrypted data list from outside, transfers said encrypted data list to a decryption shuffle center that is first in processing priority;

each of said decryption shuffle centers subjects the encrypted data list that has been transferred from said shuffling management center to both an order-switching process using public information and a partial decryption process using a decryption key that that decryption shuffle center possesses and returns resulting data list to said shuffling management center; and when a data list is returned from a decryption shuffle center other than a decryption shuffle center that is last in processing priority, said shuffling management center transfers said data list that has been returned as an encrypted data list to a decryption shuffle center that is next in processing priority after the decryption shuffle center that returned said data list; and when a data list is returned from the decryption shuffle center that is last in processing priority, supplies said data list as a decryption result list.

37. The anonymous decryption method according to claim 34, 35, or 36, wherein said decryption shuffle centers report to said shuffling management center certification that the order-switching process has been carried out correctly and that the partial decryption process has been carried out correctly.

38. The anonymous decryption method according to claim 34, 35, or 36, wherein said decryption shuffle centers attach certification that the order-switching process has been carried out correctly and the partial decryption process has been carried out correctly to said data lists that result from processing and report to said shuffling management center.

39. The anonymous decryption method according to claim 37, wherein said shuffling management center verifies that certification carried out by a decryption shuffle center is correct.

40. The anonymous decryption method according to claim 37, wherein said shuffling management center, after verifying that certification carried out by a decryption shuffle center is correct, transmits a data list that has been returned from said decryption shuffle center as an encrypted data list to a decryption shuffle center that is next in processing priority.

41. The anonymous decryption method according to claim 37, wherein said shuffling management center attaches certification that has been reported from all decryption shuffle centers to a decryption result list and supplies said decryption result list as output.

42. The anonymous decryption method according to claim 34, 35, or 36, wherein said shuffling management center and said decryption shuffle centers carry out sender authentication during communication.

43. The anonymous decryption method according to claim 34, 35, or 36, wherein said shuffling management center and said decryption shuffle centers confer a digital signatures of a transmission source to communication data.

44. The anonymous decryption method according to claim 34, 35, or 36, wherein:

for the same object of processing, a common session ID is added to mutually relevant public information, encrypted data lists, and decryption keys that are possessed by decryption shuffle centers;

said shuffling management center, when transferring an encrypted data list that corresponds to a particular session ID to a decryption shuffle center, and when transferring a data list to which a particular session ID has been added that has been returned from a decryption shuffle center to another decryption shuffle center as a encrypted data list, adds said particular session ID to said encrypted data list and then transfers the encrypted data list to said decryption shuffle center; and said decryption shuffle centers, when an encrypted data list to which a particular session ID has been added is transferred in from said shuffling management center, carries out an order-switching process using public information to which said particular session ID has been added, carries out a partial decryption using a decryption key to which said particular ID has been added, adds said particular session ID to a resulting data list, and returns said data list to said shuffling management center.

45. The anonymous decryption method according to claim 34, 35, or 36, wherein said shuffling management center, when a security parameter is received as input, generates common public information based on said security parameters and notifies all decryption shuffle centers of said produced common public information;

said all decryption shuffle centers generate public keys and decryption keys based on the common public information that is reported from said shuffling management center and return said generated public keys to said shuffling management center; and said shuffling management center, when public keys are returned from all of said decryption shuffle centers, both generates public encryption keys based on the public keys from all of said decryption shuffle centers and publishes public information that includes said generated public encryption keys and said common public information.

46. The anonymous decryption method according to claim 45, wherein said decryption shuffle centers, when returning public keys to said shuffling management center, add certification that said public keys have been generated correctly and then return said public keys to said shuffling management center.

47. The anonymous decryption method according to claim 46, wherein said shuffling management center verifies that certification added to public keys is correct.

48. The anonymous decryption method according to claim 46 or 47, wherein said shuffling management center publishes public keys and certification that has been added to the public keys together with public information.

49. The anonymous decryption method according to claim 45, wherein said shuffling management center and said decryption shuffle centers perform sender authentication during communication.

50. The anonymous decryption method according to claim 45, wherein said shuffling management center and said decryption shuffle centers add a digital signature of a transmission source to communication data.

51. The anonymous decryption method according to claim 44, wherein: when transferring an encrypted data list to a decryption shuffle center, said shuffling management center adds, in addition to said session ID, a shuffling management center ID that is conferred to that shuffling management center, a decryption shuffle center ID that is conferred to the decryption shuffle center that is a transfer destination, and a signature of that shuffling management center.

52. The anonymous decryption method according to claim 44, wherein: when returning data lists to said shuffling management center, said decryption shuffle centers adds, in addition to said session ID, a decryption shuffle center ID that is conferred to that decryption shuffle center, a shuffling management center ID that is conferred to said shuffling management center, and a signature of that decryption shuffle center.

53. The anonymous decryption method according to claim 52, wherein: said decryption shuffle center, when returning a data list to said shuffling management center, also adds certification data for certifying that the order-switching process has been carried out correctly and certification data for certifying that the partial decryption process has been carried out correctly.

54. The anonymous decryption method according to claim 41, wherein the information that is supplied by said shuffling management center comprises:
a shuffling management center ID that is conferred to that shuffling management center,
an encrypted data list that has been received as input from outside,
decryption results for said encrypted data list,
a session ID that is conferred to said encrypted data list,
all data that have been returned from all decryption shuffle centers, and
a signature of the shuffling management center.

55. An anonymous decryption method according to claim 45, wherein said shuffling management center, when reporting common public information and a security parameter to decryption shuffle centers, adds:
a shuffling management center ID that is conferred to that shuffling management center;
decryption shuffle center IDs of all decryption shuffle centers that perform decryption;
a session ID; and
a signature of the shuffling management center.

56. The anonymous decryption method according to claim 45 or 46, wherein a decryption shuffle center adds to information that is returned to the shuffling management center:
a shuffling management center ID that is conferred to said shuffling management center;
a session ID;
a decryption shuffle center ID of that decryption shuffle center; and
a signature of that decryption shuffle center.

57. The anonymous decryption method according to claim 45, wherein the public information that said shuffling management center publishes comprises:
a shuffling management center ID that is conferred to that shuffling management center;
a session ID;
a security parameter;
a public encryption key;
decryption shuffle center IDs of all decryption shuffle centers; and
public keys that have been generated by all decryption shuffle centers.

58. The anonymous decryption method according to claim 37, wherein certification performed by a decryption shuffle center can be verified by a third party.

59. The anonymous decryption method according to claim 34, 35, or 36, wherein said decryption shuffle center calculates a portion of data that are used in an order-switching process before input of an encrypted data list, and when an encrypted data list has been received as input, carries out the order-switching process using the data that have been calculated in advance.

60. The anonymous decryption method according to claim 38, wherein said decryption shuffle center calculates a portion of data that are used in generating certification data for certifying that an order-switching process is correct before input of an encrypted data list, and when an encrypted data list is received as input, generates said certification data using data that have been calculated in advance.

61. The anonymous decryption method according to claim 34, wherein a vote management center:
accepts encrypted vote data that are sent from each voter, said encrypted vote data being vote data that have been encrypted based on said public information;
selects legitimate encrypted vote data of legitimate voters from among the encrypted vote data; and
transmits the selected encrypted vote data as an encrypted data list to said shuffling management center.

62. The anonymous decryption method according to claim 61, wherein:
each of said voters transmits to said vote management center certification data for certifying that vote data have been correctly encrypted; and
said vote management center verifies certification data that have been transmitted in from each voter.

63. The anonymous decryption method according to claim 34, wherein a bidding management center:

accepts encrypted bid values that are sent from each bidder and in which bid values have been encrypted based on said public information;

selects from among these received encrypted bid values legitimate encrypted bid values of legitimate bidders; and transmits these selected encrypted bid values as an encrypted data list to said shuffling management center.

64. The anonymous decryption method according to claim 63, wherein:

each of said bidders transmits to said bidding management center certification data for certifying that bid values have been correctly encrypted; and said bidding management center verifies certification data that have been sent in from each bidder.

65. The anonymous decryption method according to claim 34, wherein a receiving center:

receives encrypted survey responses that are sent in from each survey respondent and in which survey responses have been encrypted based on said public information;

selects from among the received encrypted survey responses legitimate encrypted survey responses of legitimate survey respondents; and transmits the selected encrypted survey responses as an encrypted data list to said shuffling management center.

66. An anonymous decryption method according to claim 65, wherein said survey respondents transmit to said receiving center certification data for certifying that survey responses have been correctly encrypted; and said receiving center verifies certification data that are sent in from each survey respondent.

67. The anonymous decryption method according to claim 34, wherein said shuffling management center receives program instructions for performing management-side initial setting and decryption control.

68. A program for, of a computer for a shuffling management center and a computer for a decryption shuffle center that constitute an anonymous decryption system that takes as input an encrypted data list that includes a plurality of items of encrypted data that have been encrypted by a specified method and specified public information and that supplies results of decrypting each item of encrypted data without relation to order on the list, causing said computer for the shuffling management center to execute processes of:

when an encrypted data list is received as input from outside, transferring said encrypted data list to the computer for the decryption shuffle center; and when a data list is returned from said computer for a decryption shuffle center, supplying said data list as a decryption result list; and causing said computer for the decryption shuffle center to execute processes of:

subjecting an encrypted data list that is transferred from said computer for the shuffling management center to both an order-switching process using public information and a partial decryption process using a decryption key that is possessed by that computer for the decryption shuffle center and returning a resulting data list to said computer for the shuffling management center.

69. A program for, of a computer for a shuffling management center and a plurality of computers for decryption shuffle centers that constitute an anonymous decryption system that takes as input an encrypted data list that includes a plurality of items of encrypted data that have been encrypted by a specified method and specified public information and that supplies results of decrypting each item of encrypted data on the encrypted data list without relation to order on the list, causing said computer for the shuffling management center to execute processes of:

when an encrypted data list is received as input from outside, transferring said encrypted data list to the computer for the decryption shuffle center that is first in processing priority; and when a data list is returned from a computer for a decryption shuffle center other than the computer for the decryption shuffle center that is last in processing priority, transferring as an encrypted data list said data list that has been returned to the computer for the decryption shuffle center that is next in processing priority after the computer for the decryption shuffle center that returned said data list; and when a data list is returned from the computer for the decryption shuffle center that is last in processing priority, supplying said data list as a decryption result list; and causing each of said computers for the decryption shuffle centers to execute processes of:

subjecting an encrypted data list that has been transferred from said computer for the shuffling management center to both an order-switching process using public information and a partial decryption process using a decryption key that is possessed by the computer for that decryption shuffle center and returning resulting data list to said computer for the shuffling management center.

70. A recording medium for storing a program for, of a computer for a shuffling management center and a computer for a decryption shuffle center that constitute an anonymous decryption system that takes as input an encrypted data list that includes a plurality of items of encrypted data that have been encrypted by a specified method and specified public information and that supplies results of decrypting each item of encrypted data without relation to order on the list, causing said computer for the shuffling management center to execute processes of:

when an encrypted data list is received as input from outside, transferring said encrypted data list to the computer for the decryption shuffle center; and when a data list is returned from said computer for the decryption shuffle center, supplying said data list as a decryption result list; and causing said computer for the decryption shuffle center to execute processes of:

subjecting an encrypted data list that is transferred from said computer for the shuffling management center to both an order-switching process using public information and a partial decryption process using a decryption key that is possessed by that computer for the decryption shuffle center and returning resulting data list to said computer for the shuffling management center.

71. A recording medium for storing a program for, of a computer for a shuffling management center and a plurality of computers for decryption shuffle centers that constitute an anonymous decryption system that takes as input an encrypted data list that includes a plurality of items of encrypted data that have been encrypted by a specified method and specified public information and that supplies results of decrypting each item of encrypted data on the encrypted data list without relation to the order on the list, causing said computer for the shuffling management center to execute processes of:

when an encrypted data list is received as input from outside, transferring said encrypted data list to the computer for the decryption shuffle center that is first in processing priority; and when a data list is returned from a computer for a decryption shuffle center other than the computer for the decryption shuffle center that is last in processing priority, transferring as an encrypted data list said data list that has been returned to the computer for the decryption shuffle center that is next in processing priority after the computer for the decryption shuffle center that returned said data list; and when a data list is returned from the computer for the decryption shuffle center that is last in processing priority, supplying said data list as a decryption result list; and causing each of said computers for the decryption shuffle centers to execute processes of:

subjecting encrypted data list that has been transferred from said computer for the shuffling management center to both an order-switching process using public information and a partial decryption process using a decryption key that is possessed by the computer for that decryption shuffle center and returning the resulting data list to said computer for the shuffling management center.

* * * * *